United States Patent [19]

Taylor

[11] Patent Number: 4,571,537
[45] Date of Patent: Feb. 18, 1986

[54] CONDITION MONITORING MEANS

[75] Inventor: Robert E. Taylor, Cadillac, Mich.

[73] Assignee: Nartron Corporation, Reed City, Mich.

[21] Appl. No.: 724,815

[22] Filed: Apr. 18, 1985

Related U.S. Application Data

[63] Continuation of Ser. No. 394,496, Jul. 2, 1982, abandoned.

[51] Int. Cl.$^4$ .............................................. H02J 3/12
[52] U.S. Cl. .................................... 323/326; 323/242; 323/245; 340/52 C; 340/52 B
[58] Field of Search ...................... 323/242, 245–246, 323/300, 323, 325–326; 340/52 R, 52 A, 52 B, 52 C, 52 D; 307/118, 142, 144; 188/1.11, 151 A, 356, 357

[56] References Cited

U.S. PATENT DOCUMENTS 3,421,322  1/1969  Reznicek .......................... 340/52 C
3,806,868  4/1974  Portman ........................... 340/52 D
4,074,226  2/1978  Takeda et al. .................. 188/1.11 X

OTHER PUBLICATIONS

"Silicon Economy Programmable Unijunction Transistor", General Electric, 60.20, 11/1967.

Primary Examiner—Peter S. Wong
Attorney, Agent, or Firm—Lon H. Romanski

[57] ABSTRACT

A monitoring circuit for monitoring the condition of, for example, a remotely situated structure is shown as having a transducer responsive to the occurrence of a preselected condition in the remotely situated structure and effective for causing a signal indicative thereof; timing apparatus actuated upon the occurrence of the signal effective to establish the validity thereof; a power circuit electrically closed upon the expiration of a time span established by the timing apparatus, and sensory warning apparatus actuated upon electrical closure of the power circuit.

7 Claims, 3 Drawing Figures

CONDITION MONITORING MEANS

RELATED APPLICATION

This application is a continuation of application Ser. No. 394,496, filed July 2, 1982, now abandoned.

FIELD OF THE INVENTION

This invention relates generally to the field of monitoring means for monitoring related structure in order to detect the existance or non-existance of a preselected condition and in response thereto causing a signal indicative thereof, and, more particularly to such electrical monitoring means for performing the aforestated functions as in, for example an automotive vehicle.

BACKGROUND OF THE INVENTION

Automotive vehicles (as, for example, automobiles, trucks and/or buses) have been, in the generally recent past, designed with greater sophistication as regards, for example, vehicular braking systems as well as other apparatus for physically assisting the vehicle operator to operate the vehicle and/or informing or warning the vehicle operator of the occurrance of a particular condition which condition may or may not be undesirable.

For all practical purposes at least an overwhelming majority of automotive vehicles are now constructed as to include what is commonly referred to as a "power brake" system or a "power assist" brake system. Usually, such vehicular brake systems are comprised of, for example, a two chamber housing with a pressure responsive movable wall or diaphragm means therein effectively forming a common wall as generally between such two chambers. One of the chambers is, in the main, at ambient pressure while the second of such chambers is effective for having, for example, an engine generated vacuum applied thereto. When the vehicular operator actuates the operator brake pedal, such motion is converted to a valving function whereby an increasing (depending upon the degree of brake pedal application) magnitude of vacuum is made to exist in such second chamber causing, in turn, the movement of the pressure responsive wall means which, in turn, causes the movement of a hydraulic piston which serves to displace and pressurize related brake fluid means resulting in the application or energization of the vehicular wheel braking means.

In such "power assist" brake systems, the vacuum to the said second chamber (through the related valving means) may be supplied generally directly by conduit means operatively interconnecting such said second chamber and the engine intake manifold or it may be supplied through conduit means having a vacuum tank, accumulator or reservoir in series circuit therewith. Such vacuum tanks, accumulators or reservoirs are, in effect, a safety measure assuring that if the engine should for some reason stall or cease operation while the vehicle is in motion, there will still be a minimum amount of vacuum sufficient to stop the vehicle. Most often, such vacuum reservoirs are employed as on trucks and buses since the braking systems thereof require relatively large amounts of vacuum which exceed the amount that the engine could instantaneously deliver.

In the recent past automobile engines have been made much smaller some having 1.5 liter, or even less, displacement. One of the consequences of such is that the reduced "breathing" capacity of the engine also limits the volumetric capacity of the engine vacuum developed thereby. It has been discovered that at times the magnitude of the available vacuum for vehicle braking has diminished to a degree which might become unsafe especially if the vehicle is traveling at a fairly fast speed and under relatively high engine load.

Accordingly, the invention herein disclosed is primarily, although not exclusively, directed to a means whereby, upon the vacuum available for vehicle braking (for any reason) decreases in magnitude to a preselected value, a signal is generated for alerting the vehicle operator. However, as will become more apparent, even though the problems described arose in a particular field or art, the invention is not so limited and may be employed in differing fields or arts.

SUMMARY OF THE INVENTION

According to the invention, a monitoring means for monitoring the condition of remotely situated apparatus comprises first means responsive to the occurrence of a preselected condition in said remotely situated apparatus, said first means comprising timing means effective for sensing said occurrence of said preselected condition and upon so sensing said occurrence initiating a timing span, and second means effective to actuate sensory warning means, said second means being effective to actuate said warning means only if said preselected condition continues to exist during the entire timing span and continues to exist upon expiration of said timing span.

Various general and specific objects, advantages and aspects of the invention will become apparent when reference is made to the following detailed description considered in conjunction with the accompanying drawings

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
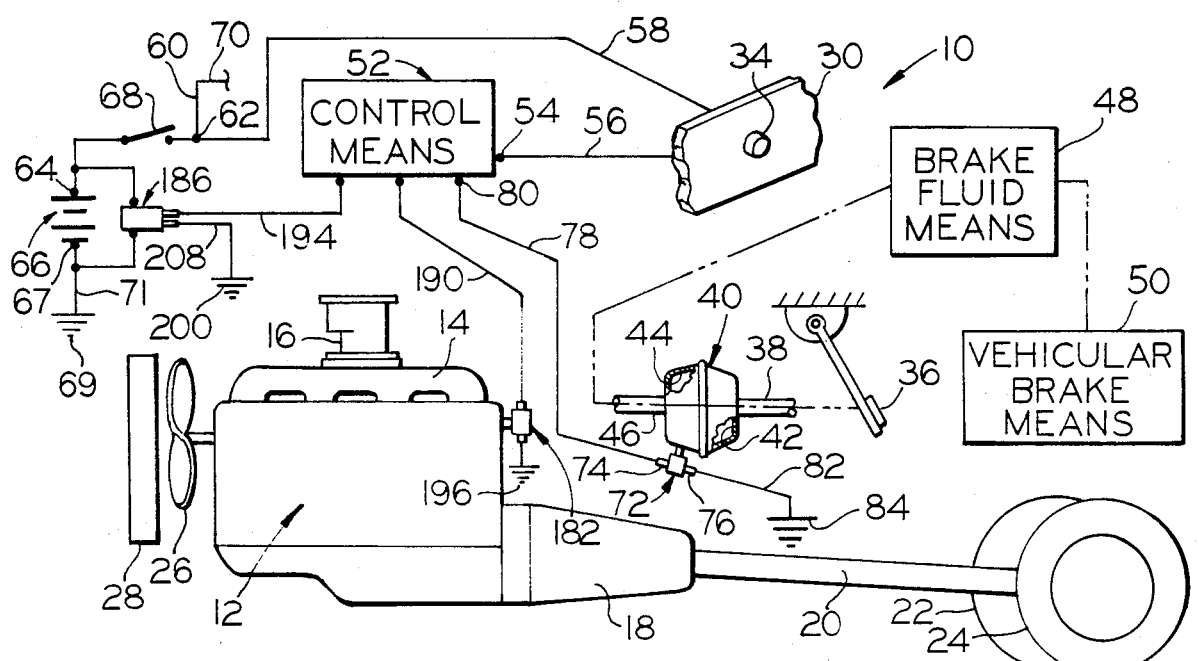
FIG. 1 is a view, partly diagrammatic and partly schematic illustrating vehicle means employing teachings of the invention.

Referring now in greater detail to the drawings, FIG. 1 illustrates, in part, a vehicle 10 having an engine assembly 12 which may comprise an intake or induction manifold 14 and motive fluid induction and metering means 16. An engine transmission means 18 is illustrated as operatively connected to drive shaft means 20 leading to and operatively connected with vehicular ground engaging drive wheel means 22 and 24. An engine driven fan 26 as well as a coolant radiator means 28 may be provided.

A fragmentary portion of the vehicular dash panel, or the like, is shown at 30 and is provided with sensory signal means 32 which, in the preferred embodiment comprises a lamp or bulb means 34.

An operator actuatable pivotally supported brake pedal means 36 is operatively connected, as via motion transmitting means 38 to a brake power assist means 40 having a first chamber 42 generally at ambient pressure and a second chamber 44 at a vacuum of variable magnitude generally depending upon the degree of actuation of said brake pedal 36. (The connection between, for example, the intake manifold and chamber 44 is not shown since such is well known in the art, and further, the practice of the invention does not depend upon the source of nor the fluid circuitry for delivering the vacuum to chamber 44.)

As is generally well known, actuation of brake pedal means 36 results in a valving function to occur generally within assembly 40 allowing for a greater magnitude of vacuum to occur within chamber 44 and such increased vacuum magnitude causes output means 46 to move as to pressurize and displace related hydraulic brake fluid from an associated brake fluid reservoir 48. The thusly pressurized and displaced brake fluid then causes the vehicular brake means 50 to be actuated as to be applied against the vehicular wheel means 22 and 24 as well as against other ground-engaging wheel means (not shown) of the vehicle 10.

A monitoring and/or control means 52 has a first terminal means 54 electrically connected, as via conductor means 56, to one electrical side of the sensory warning means 34 while the other electrical side or end of warning means 34 is electrically connected as via conductor means 58 to conductor means 60, as at a point 62 thereof. The conductor means 60 may have one end 64 thereof electrically connected to one electrical side of a source of electrical potential 66 and, further, comprise serially situated switch means 68. The other (shown) end 70 of conductor means 60 may lead to engine related circuitry as for example engine ignition and/or engine fuel supply means. That is, in the broad sense switch means 68 may be considered as an engine master switch means effective for, among other things, closing of an ignition circuit as for a conventional Otto cycle internal combustion engine or for the closing of associated circuitry as for the starting and running of an internal combustion engine of a Diesel cycle. The other electrical side or terminal 67 of source of electrical potential 66 may be connected to ground 69 as via conductor means 71.

A pressure responsive switching means 72, shown in communication with the vacuum as within chamber 44, has terminals 74 and 76 which, respectively, are electrically connected via conductor means 78 to terminal means 80 of control or monitor means 52 and, via conductor means 82 to ground potential as at 84.

Figure 2:
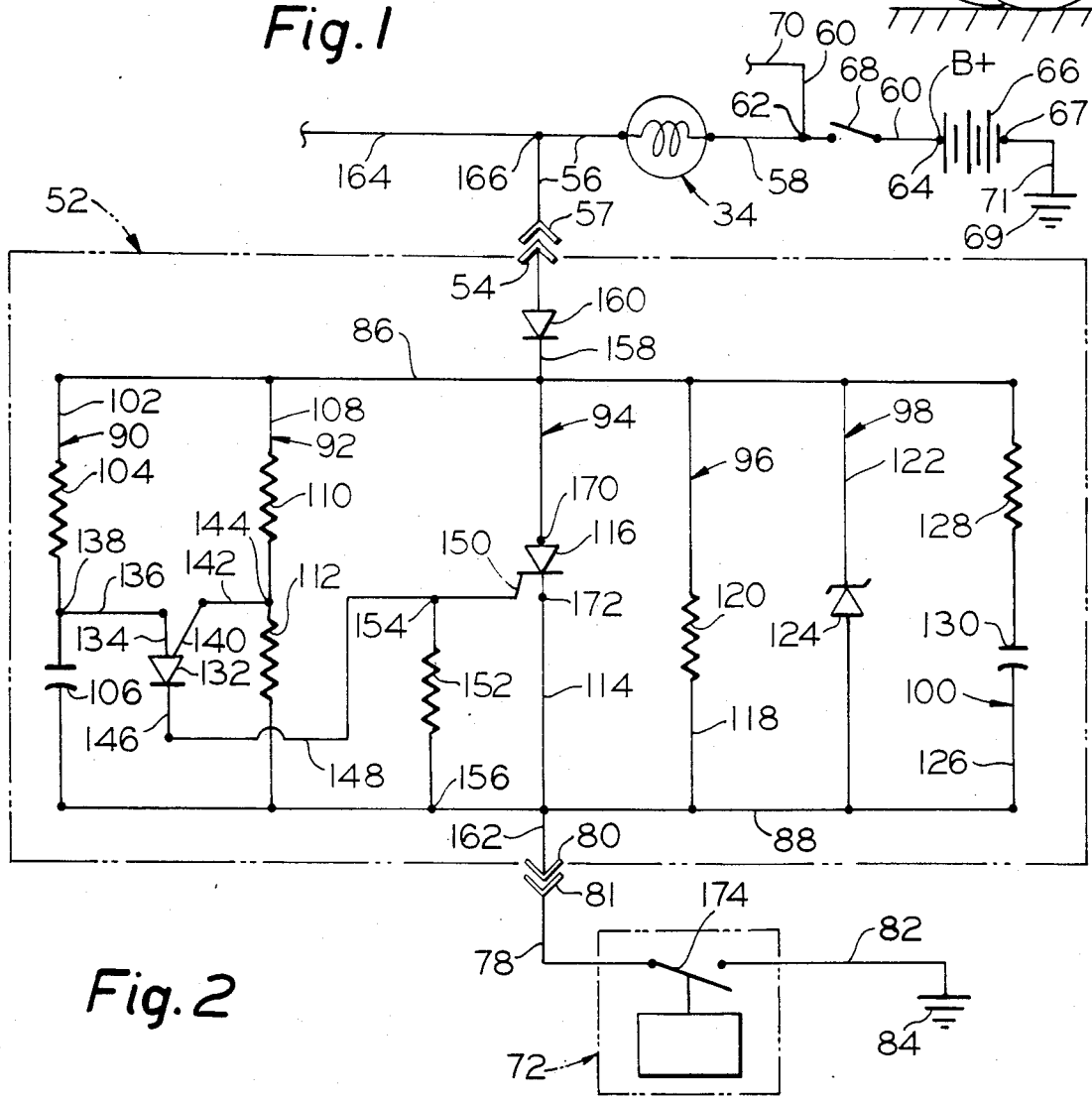
FIG. 2 is a schematic wiring diagram employing teachings of the invention.

As depicted in FIG. 2, preferably terminal 54 of the monitor and control means 52 is of the plug-in type adapted to cooperatively connect and electrically close with a terminal means 57 carried as by conductor means 56. Similarly, preferably, terminal 80 of the monitor and control means 52 is of the plug-in type adapted to cooperatively connect and electrically close with a terminal 81 carried as by conductor means 78.

As depicted in FIG. 2, the preferred embodiment of the monitor and control means 52 preferably comprises electrical conductor means 86 and 88 which are operatively electrically interconnected by branch circuit portions 90, 92, 94, 96, 98 and 100.

Branch circuit portion 90 comprises electrical conductor means 102 which, in turn, comprises serially situated resistor ans 104 and capacitor means 106.

Branch circuit portion 92 comprises electrical conductor means 108 which, in turn, comprises serially situated resistor means 110 and 112.

Branch circuit portion 94 comprises conductor means 114 which, in turn, comprises a silicon controlled rectifier (SCR) 116.

Branch circuit portion 96 comprises conductor means 118 which, in turn, comprises resistor means 120.

Branch circuit portion 98 comprises conductor means 122 which, in turn, comprises zener diode means 124.

Branch circuit portion 100 comprises conductor means 126 which, in turn, comprises series situated resistor means 128 and capacitor means 130.

A programmable unijunction transistor (PUT) 132 has its anode 134 electrically connected, as via conductor means 136, to branch circuit portion 90 as at a point 138 generally electrically between resistance 104 and capacitance 106. The gate 140 of PUT 132 is electrically connected, as via conductor means 142, to branch circuit portion 92 as at a point 144 thereof generally electrically between resistors 110 and 112. The cathode 146 of PUT 132 is electrically connected, as via conductor means 148, to the gate terminal 150 of SCR 116. A resistance means 152 has one electrical end thereof electrically connected to both cathode 146 and gate 150 as by virtue of, for example, its electrical connection to conductor means 148, as at a point 154 thereof, while the other electrical end is electrically connected to conductor means 88 as at a point 156 thereof.

In the preferred embodiment, a conductor means 158 comprising diode means 160 serves to electrically interconnect the plug-in terminal 54 to conductor means 86 and the various branch circuit portions. Similarly, a conductor means 162 serves to electrically interconnect the plug-in terminal 80 to conductor means 88 and the various branch circuit portions. A conductor means 164 may be electrically connected, as at point 166, to conductor means 56 and lead to other vehicular related means for, at times, causing a closure of the circuit through warning means 34 to indicate other conditions not monitored by means 52.

In the embodiment of FIG. 2, diode 160 serves to protect the remaining portion of the circuitry from either an accidentally applied or created reverse voltage. Such could occur, for example, as by electrically connecting an external battery or alternator (or generator) to the vehicle electrical system as during what is commonly referred to as a "jump start" when the vehicular battery has a charge insufficient to crank the engine.

Zener diode 124 serves to protect the circuitry from possible damage as might otherwise occur from transient over-voltage conditions which can occur in automotive systems due to, for example, the turn-off of heavy inductive loads as, for example, disengagement of a vehicular air conditioner drive clutch means or failure of the vehicular voltage regulating means to respond quickly enough to electrical load changes. Consequently, zener diode 124 will provide such protection to the SCR 116 and the PUT 132.

The PUT 132 has a characteristic such that if the gate 140 is biased at a positive voltage relative to the anode 134 only a very small cathode current will flow with such being generally in the order of a microampere or even less. As the voltage difference between the gate 140 and anode 134 is reduced, a point is reached (at possibly a few tenths of a volt difference) where the anode 134 to cathode 146 path avalanches into conduction. Consequently, effectively instantaneously, an ampere or so of current may be allowed to flow through the anode 134 to cathode 146 path (circuit) although continuous high current flow would destroy the PUT 132.

The SCR 116 normally blocks current flow through the anode to cathode circuit. However, when current is attempting to flow from anode 170 to cathode 172 of SCR 116, a quick pulse of current applied to the gate 150 will turn the SCR 116 "on" as to make the anode 170 to cathode 172 conductive and thereby having a working current flow therethrough. Further, once the flow of a working current through the anode 170 to cathode 172 is initiated, such flow of current continues even though the application of current to the gate 150 is terminated. Such working current will continue to flow through the anode-to-cathode circuit of the SCR 116 until such flow of working current is terminated at some other point in the associated working circuit.

In the embodiment of FIG. 2, series resistors 110 and 112 comprise voltage divider means which will, as to be discussed, provide a positive (+) bias to the gate 140 of PUT 132 with respect to the anode 134 thereof.

OPERATION OF INVENTION

Let it now be assumed that the vehicular engine energizing switch means 68 is closed and that the engine 12 and vehicle 10 are operating; also, let it be assumed that switch member 174 of sender means 72 is open. During such operation, it can be seen that the entire circuitry, comprised of conductor means 86, 88 and branch circuit portions 90, 92, 94, 96, 98 and 100 are effectively at a voltage potential of B+ which is the potential as at terminal 64 of the source of electrical potential 66, and capacitor means 106 and 130 are effectively discharged and, further there is no positive bias on gate 140 with respect to anode 134 of PUT 132. Therefore, there is no conduction through SCR 116 and the sensory warning means 34 is not energized by the monitor and control means 52.

However, let it now be assured that sensor-sendor means 72 senses a reduction in the magnitude of the vacuum, as within chamber means 44 (FIG. 1), to a preselected magnitude and as a consequence causes sender switch means 174 to become electrically closed.

At the initial closing of switch means 174, current starts to flow through the voltage divider means of branch circuit portion 92 causing point 144 (in the preferred embodiment) to have a voltage value of ½ B+. This value of voltage is applied to gate 140 of PUT 132 by means of conductor 142. Since, at initial closing of switch means 174 capacitor 106 is in a discharged state, anode 134, electrically connected to branch circuit portion 90 as at point 138 electrically between resistor 104 and capacitor 106, is effectively at zero volts thereby being negative (−) with respect to point 144 and gate 140 which are at ½ B+.

Also, at the instant of closing of switch means 174, capacitor means 106 starts to charge through resistor means 104. The charging of capacitor means 106 continues and as such continues the magnitude of the voltage at point 138, and therefore anode 134, increases. Such increases continue until the previously existing voltage differential between gate 140 and anode 134 is effectively eliminated at which time the PUT 132 will go into conduction. In the embodiment disclosed in FIG. 2 and with the values of the various components employed the time span or elapsed time between the instant that switch means 174 closes and PUT 132 goes into conduction is in the order of 20.0 seconds. Of course, such time delay can be altered as by the selection of a different RC constant and/or a different selection of resistor means 110 and 112.

In any event, when PUT 132 is thusly made conductive, the anode 134 to cathode 146 circuit thereof serves to discharge capacitor 106 and the resulting pulse-like current flow is applied, via conductor means 148, to the gate 150 of SCR 116 causing the SCR 116 to become conductive through its anode 170 to cathode 172 circuit. When the SCR 116 thusly becomes conductive, the circuit through the sensory warning means or associated output electrical load neans 34 becomes closed causing energization of such means 34. The lamp means 34 will continue to be energized until switch means 174, or engine energizing switch means 68 is opened thereby terminating the flow of working current through the anode 170 cathode 172 circuit of SCR 116 and, because a current pulse no longer exists on gate 150 of SCR 116, causes the SCR 116 to become non-conductive de-energizing the lamp or load means 34.

It is contemplated that situations may arise during use of the invention wherein after the SCR 116 is made conductive and the sensed condition which originally led to the SCR 116 being made conductive has not yet actually terminated, that switch means 174 may, for some reason, momentarily open and then again close. If such were to occur, the said momentary opening of the switch means 174 would cause the working current through SCR 116 to also terminate in turn causing the SCR 116 to become non-conductive and de-energize sensory warning means 34 thereby creating a false output signal to the vehicle operator or other operating means related to such sensory warning means. This contemplated possibility is effectively prevented by the resistor 128 and capacitor 130.

That is, when switch means 174 of sender means 72 closes (in response to a sensed preselected condition) not only capacitor 106 but also capacitor 130 starts to become charged. Unlike capacitor 106 which discharges through PUT 132 in order to cause SCR 116 to become conductive, capacitor 130 does not discharge during either the moment of causing SCR 116 to go into conduction or during its conductive state. However, the charge on capacitor 130 is of such a magnitude as to maintain SCR 116 conductive during the said contemplated erroneous momentary opening of sender switch means 174. That is, remembering that SCR 116 will remain conductive for so long as a working current is supplied therethrough, if switch means 174 should erroneously and momentarily open the circuit through the SCR 116 and switch means 174 would also momentarily open and thereby, normally, terminate current flow through the SCR 116 and cause it to become non-conductive. However, if and when such a momentary opening of switch means 174 occurs, capacitor 130 discharges through the SCR 116 thereby continuing to supply a working current flow through the SCR 116 and prevent it from becoming non-conductive.

Accordingly it can be seen that the resistor 128 and capacitor 130 provide a time delay after the opening of the sender switch means 174 in order to thereby effectively test the validity of such opening of switch means 174.

In the preferred embodiment, resistor means 120 is provided in order to present a discharge path for capacitor means 130 upon the valid and continued opening of switch means 174. Further, in the preferred embodiment, resistor means 152 is employed to provide a relatively low-resistance path across the gate 150 to cathode 172 terminals of the SCR 116 thereby preventing the spurious triggering of the SCR 116 as by electrical noise in the overall system and environment. In one particularly successful embodiment of the invention, the following elements had the respectively indicated values:

Resistor 104: ¼ watt; 820K ohms
Resistor 110: ¼ watt; 56K ohms
Resistor 112: ¼ watt; 56K ohms
Resistor 152: ¼ watt; 1.0K ohms
Resistor 120: ¼ watt; 1.0K ohms
Resistor 128: ¼ watt; 4.7 ohms The PUT 132 was a type MPU131 silicon programmable unijunction transistor manufactured and sold by Motorola, Inc. and described as on pages 1121, 1122 and 1123 of the publication entitled "The Semiconductor Data Library Series A Volume III" published by Motorola, Inc. and bearing a United States of America copyright notice of 1974; the SCR 116 was a type 2N5061 silicon controlled rectifier manufactured and sold by Motorola, Inc. and described as on pages 2-14 and 2-15 of the publication entitled "The Semiconductor Data Library Series A Volume II" published by Motorola, Inc. and bearing a United States of America copyright notice of 1974, the zener diode was of the type IN4751, having a nominal zener voltage of 30.0 volts, the equivalent of which is manufactured and sold by Motorola, Inc. and described as on pages 1-100 and 1-101 of the publication entitled "The Semiconductor Data Library Series A Volume I" published by Motorola, Inc. and bearing a United States of America copyright notice of 1974; diode 160 was of the type IN4003; capacitor 106 was rated at 33µf while capacitor 130 was rated at 220µf.

Figure 3:
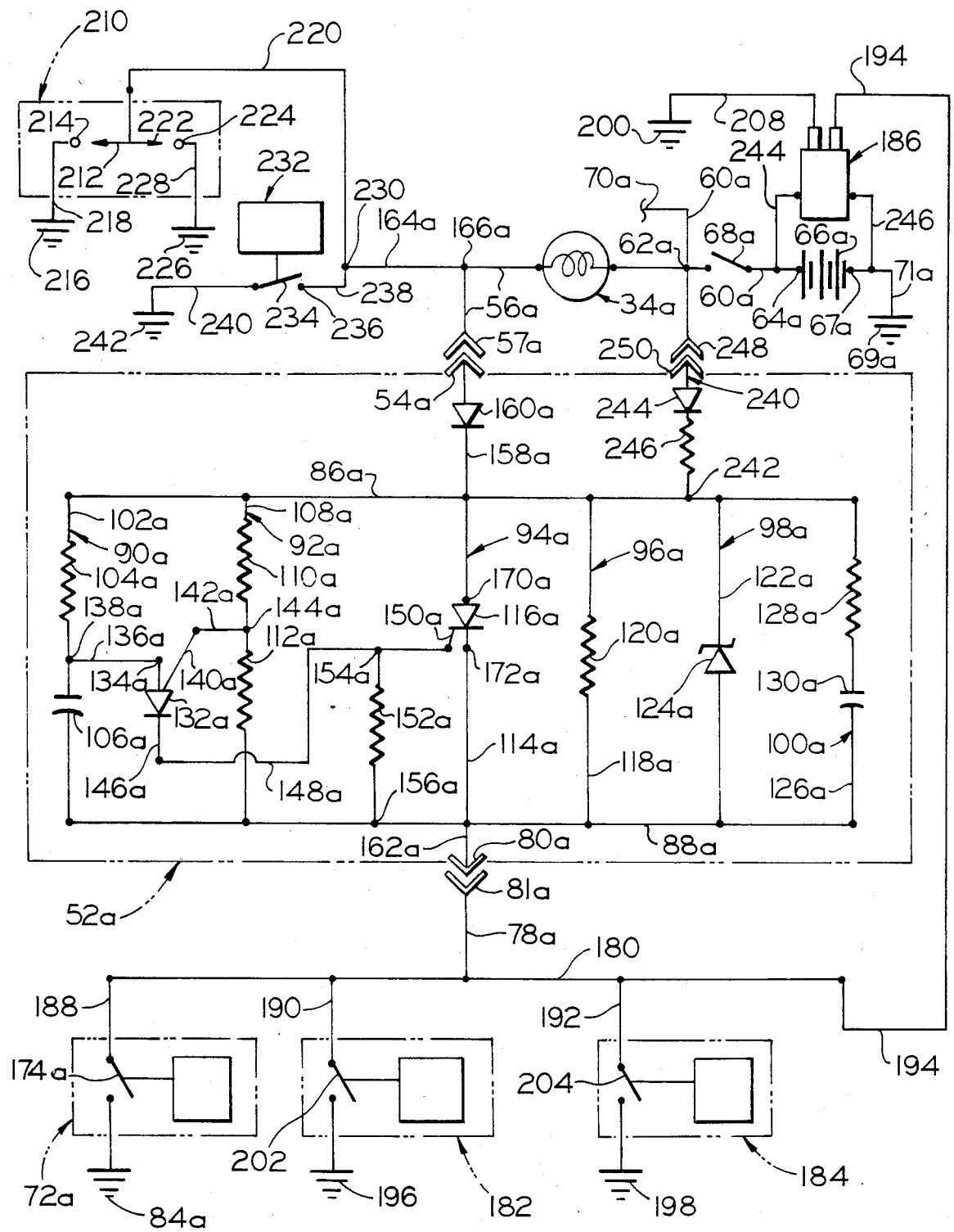
FIG. 3 is a schematic wiring diagram, in a somewhat different environment, also employing teachings of the invention.

In FIG. 3 all elements which are like or similar to those of FIGS. 1 and/or 2 are identified with like reference numbers provided with a suffix "a". Only so much of FIG. 1 is repeated in FIG. 3 as is necessary for a complete understanding of the apparatus or system of FIG. 3.

Referring in greater detail to FIG. 3, the conductor 78a is electrically connected to associated conductor means 180 which, in turn, is electrically connected to a plurality of sensing and sender or transducer means 72a, 182, 184 and 186 as by conductor portions 188, 190, 192 and 194, respectively, grounded as at 84a, 196, 198 and 200. As depicted such transducer means 72a, 182, 184 and 186 respectively comprise switch means or members 174a, 202 and 204 in series with conductors 188, 190 and 192 so as to at times close the respective circuits therethrough to ground. The actual switch means or member within sensor or transducer 186 is not shown; however, it will be understood that such transducer means 186 does comprise suitable switching means and that such switching means is at times closed to thereby complete the circuitry as between conductor means 194 and 208 leading to ground 200.

Also as depicted in FIG. 3, the automotive vehicle may be provided with what is commonly referred to as a dual master brake cylinder wherein one of the master cylinders operates to supply and control the pressurized application of a hydraulic brake fluid to, for example, the vehicular front wheel brake means while the other of such master cylinders operates to supply and control the pressurized application, through separate conduit means, of a hydraulic brake fluid to the vehicular rear wheel brake means. The transducer means 210 depicts a switching means which is responsive to the loss (as by, for example, leakage of hydraulic brake fluid or by a rupture in a conduit for conveying such fluid) hydraulic fluid and upon such loss is effective for closing either of two electrical circuits to ground.

For example, if there should be such a hydraulic failure in the braking system leading to the vehicular front wheels, switch member 212 will electrically close, as against contact means 214, completing a circuit to ground 216 through conductor means 218 and 220. Similarly, if there should be such a hydraulic failure in the braking system leading to the vehicular rear wheels, switch member 222 will electrically close, as against contact means 224, completing a circuit to ground 226 through conductor means 228 and 220. It will be noted that conductor means 220 is electrically connected to conductor means 164a as at a point 230 and therefore, anytime that the engine energizing or master switch means 68a is closed and either of the described vehicular brake failure conditions occurs, the sensory warning means 34a becomes energized.

Further automotive vehicles are usually provided with what is commonly referred to as either an "emergency" brake system or a "parking" brake system. This is a manually (operator) applied vehicular wheel braking system which employs mechanical notion transmission means as, for example, steel cables which are operatively connected to and between the braking mechanisms carried by the vehicular wheel assemblies and a lever means or the like within the vehicular passenger compartment.

The transducer or sensor means 232 comprises switching means 234 which is normally open when the vehicular emergency or parking brake is released (not applied or energized). However, when such emergency or parking brake is applied, as by the vehicle operator, switch means 234 becomes electrically closed, as against contact means 236, thereby completing a circuit through conductor means 238 and 240 to ground 242. Conductor means 238 is electrically connected to conductor means 164a as at point 230; therefore anytime that master or engine energizing switch means 68a is closed and switch means 234 is also closed, the sensory warning means 34a will be energized making the operator aware of the condition.

As should be apparent, the energization of warning or output means 34a, by transducer or sensor means 210 and 232 is not in any way dependent upon the operation of the circuitry or means 52a. However, it should also now be evident that such sensor, sender or transducer means as at, for example, 210 and 232, may be employed in an overall system employing the monitoring and/or control system of the invention.

Transducer or sender switch means 72a is as that as shown in and described with reference to means 72 of FIGS. 1 and 2.

Transducer, sensor or sender switch means 182 may be responsive to the temperature of engine 12, as generally depicted in FIG. 1, so as to cause, for example, the closure of switch member 202 upon the sensed temperature of the engine 12 increasing to a preselected magnitude which may represent an undesirable condition.

Transducer, sensor or sender switch means 184 may be responsive to, for example, the presence and/or absence of a sufficient quantity of engine coolant (as may exist in the radiator means 28 and within the engine coolant paths) so as to be capable of quickly responding to a loss of coolant and give the operator a warning as via sensory warning means 34a even before the engine reaches an undesirable high temperature resulting from such coolant loss.

Transducer, sensor or sender switch means 186, as through electrical conductor means 244 and 246 is responsive to the degree of electrical charge carried by the source of electrical potential 66a and, more particularly, effective for closing the electrical circuit as through conductors 194 and 208 when the sensed electrical charge, of source 66a, is less than a preselected minimum magnitude. Accordingly, if such an insufficient charge is sensed (a circuit through conductors 194 and 208 therefore being closed) and the vehicle operator closes master or engine energizing switch 68a, the sensory warning means 34a will become energized thereby advising the operator of an undesired condition.

The operation of the circuitry 52a is as that described with reference to FIG. 2 so that, among other things, there are the discussed and described time or qualifying delays whenever any of transducer means 72a, 182, 184 or 186 is actuated in response to the occurrence of a preselected or predetermined condition. It should be apparent that other transducer means responsive to still other conditions could be operatively connected to means 52a.

In the preferred embodiment of the arrangement depicted in FIG. 3, additional conductor means 240 is provided as between, for example, point 62a and a point 242 of circuitry 52a. As illustrated, such conductor means comprises diode means 244 and serially situated resistance means 246. Of course, suitable contact or terminal means 248 and 250 may also be included.

The provision of such diode means 244 and resistance means is, in the main, precautionary. That is, in at least some circumstances if after the SCR 116a has been made conductive, as previously described with reference to FIG. 2, and, for example, switch means 210 and/or switch means 234 should become closed, such closing could cause the SCR 116a to become turned "off" (non conductive) because the available current would pass through the path of least resistance which could be, either or both, closed switch means 210 and 234. Such turning "off" of the SCR 116a could occur even though one or more of the sensors or transducers 72a, 182, 184 or 186 might still be sensing a condition wherein the SCR 116a should be maintained conductive and if such switch or switches 210 or 234 were then opened, the lamp or sensory warning means 34a would become de-energized until the timing or delay means again went through its cycle time. Therefore, by providing the conductor means 240 it can be seen that if the current through sensory warning means 34a is conducted through assumed closed switch means 234, there will still be sufficient current flow through diode 244 and resistance 246 to keep the SCR 116a conductive, if in fact, at the instant of closure of switch 234, SCR 116a is then conductive. Further, if the assumed closed switch 234 is opened, while SCR 116a is still conductive, the sensory warning means 34a will remain energized.

In view of the preceeding it can be seen that the invention provides for a means of sensing, the occurrence of a preselected condition, validating such sensing and then causing an output to related or associated means to indicate that the preselected condition has, in fact, occurred.

Although only a preferred embodiment and one alternate embodiment have been disclosed and described it is apparent that other embodiments and modifications of the invention are possible within the scope of the appended claims.

What is claimed is:

1. In a vehicle having ground engaging wheel means, manually actuatable brake system means for at times braking the rotation of at least certain of said wheel means, and vacuum actuated motor means for assisting in the actuation of said brake system means to attain said braking of at least certain of said wheel means, the improvement of providing means responsive to the magnitude of vacuum within said vacuum actuated motor means for detecting when the magnitude of said vacuum decreases to a preselected minimum magnitude and to in response thereto create a sensory warning to the operator of said vehicle, said means responsive to the magnitude of vacuum being effective to cause the creation of said sensory warning regardless of whether said brake system means is or is not undergoing actuation.

2. The improvement according to claim 1 wherein said sensory warning is created only after the expiration of a preselected span of time following the occurrence of said means responsive to the magnitude of vacuum detecting that the magnitude of said vacuum has decreased to said preselected minimum magnitude.

3. The combination of apparatus subject to varying operating conditions, sensory warning means, and circuit means for sensing when a preselected operating condition is experienced by said apparatus and in turn causing said sensory warning means to become effective for creating a sensory warning, said circuit means comprising a power circuit portion and a timing circuit portion, said timing circuit portion being activated upon the occurrence of said preselected operating condition, said timing circuit portion being effective upon the expiration of a span of time subsequent to said timing circuit portion being activated to cause said power circuit portion to be electrically closed, and said power circuit portion upon being electrically closed being effective to cause said sensory warning means to become effective for creating said sensory warning, wherein said apparatus subject to varying operating conditions comprises vacuum actuated motor means for assisting in the actuation of a vehicular brake system, wherein said preselected operating condition comprises the occurrence of a preselected minimum magnitude of vacuum in said vacuum actuated motor means, and wherein said sensory warning means when effective to create said sensory warning is effective for warning the operator of said vehicular brake system, said sensory warning means being effective upon the occurrence of said preselected operating condition to create said sensory warning regardless of whether or not said vehicular brake system is undergoing actuation.

4. The combination according to claim 3 wherein said circuit means comprises transducer means, and wherein said transducer means is effective for monitoring the magnitude of said vacuum in said vacuum actuated motor means.

5. The combination according to claim 4 wherein said timing circuit portion is effective to cause said power circuit portion to be electrically closed only if said transducer means continues to sense the existance of said preselected operating condition throughout said span of time.

6. The combination according to claim 5 wherein said timing circuit portion comprises resistor means, capacitor means, and programmable unijunction transistor means.

7. The combination according to claim 6 wherein said power circuit portion comprises a silicon controlled rectifier.

* * * * *

UNITED STATES PATENT AND TRADEMARK OFFICE
CERTIFICATE OF CORRECTION

PATENT NO. : 4,571,537

DATED : February 18, 1986

INVENTOR(S) : Robert E. Taylor

It is certified that error appears in the above-identified patent and that said Letters Patent are hereby corrected as shown below:

Column 3, line 68, before "104" change "ans" to --- means ---.

Column 5, line 41, change "assured" to --- assumed ---.

Column 6, line 14, before "34" change "neans" to --- means ---.

Column 8, line 28, change "notion" to --- motion ---.

Signed and Sealed this

Tenth Day of June 1986

[SEAL]

Attest:

DONALD J. QUIGG

Attesting Officer

Commissioner of Patents and Trademarks